US010181089B2

(12) United States Patent
Shintani et al.

(10) Patent No.: US 10,181,089 B2
(45) Date of Patent: Jan. 15, 2019

(54) USING PATTERN RECOGNITION TO REDUCE NOISE IN A 3D MAP (71) Applicants: Sony Corporation, Tokyo (JP); Sony Interactive Entertainment Inc., Tokyo (JP)

(72) Inventors: Peter Shintani, San Diego, CA (US); Jose Omar Gonzalez Hernandez, Chula Vista, CA (US); William Clay, San Diego, CA (US); Pablo Antonio Espinosa, San Diego, CA (US); Fred Ansfield, San Diego, CA (US); Bibhudendu Mohapatra, San Diego, CA (US); Keith Resch, San Diego, CA (US); Morio Usami, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/383,392

(22) Filed: Dec. 19, 2016

(65) Prior Publication Data
US 2018/0173990 A1 Jun. 21, 2018

(51) Int. Cl.
G06K 9/00 (2006.01)
G06K 9/46 (2006.01)
G06T 5/00 (2006.01)

(52) U.S. Cl.
CPC ............ *G06K 9/4671* (2013.01); *G06T 5/002* (2013.01); *G06T 2207/10028* (2013.01)

(58) Field of Classification Search
CPC .................... G06T 15/00; G06T 19/00; G06T 2207/10028; G06T 7/11; G06T 7/194; G06T 7/215; G06T 7/254
(Continued)

(56) References Cited

U.S. PATENT DOCUMENTS 6,291,816 B1 9/2001 Liu
6,420,698 B1 7/2002 Dimsdale
(Continued)

FOREIGN PATENT DOCUMENTS

EP 2225699 A1 9/2010
EP 2730939 A2 5/2014
EP 2339532 B1 4/2015

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", file history of related U.S. Appl. No. 15/432,674, filed Feb. 14, 2017.

(Continued)

*Primary Examiner* — Solomon G. Bezuayehu
(74) *Attorney, Agent, or Firm* — John L. Rogitz (57) ABSTRACT To reduce the random noise in a depth map that is rendered using colors to convey the various depths, pattern recognition may be used to selectively apply noise reduction or to modulate the strength of the noise reduction. In this way, the potential adverse effect on the detail/sharpness of the image can be ameliorated. For example, in an image of a person, the skin does not have any sharp edges so noise reduction can be applied to such an image with little adverse consequence, whereas noise reduction applied to the image of a person's eye can cause loss of the detail of the iris, eyelashes, etc. Using pattern recognition on objects in the image, the appropriate level of noise reduction can be applied across an image while minimizing blurring/loss of detail.

16 Claims, 5 Drawing Sheets (58) Field of Classification Search
USPC .... 379/47, 103, 217, 156, 199; 382/47, 103, 382/217, 156, 199
See application file for complete search history.

(56) References Cited

U.S. PATENT DOCUMENTS

| | | | |
|---|---|---|---|
| 6,442,465 | B2 | 8/2002 | Breed et al. |
| 6,970,183 | B1 | 11/2005 | Monroe |
| 7,752,483 | B1 | 7/2010 | Muresan et al. |
| 7,791,009 | B2 | 9/2010 | Johnston et al. |
| 8,730,309 | B2 | 5/2014 | Wilson et al. |
| 8,830,555 | B2 | 9/2014 | Aksamit et al. |
| 9,031,356 | B2 | 5/2015 | Kunkel et al. |
| 9,098,908 | B2 | 8/2015 | Kirk et al. |
| 9,214,492 | B2 | 12/2015 | Tempel et al. |
| 9,235,928 | B2 | 1/2016 | Medioni et al. |
| 9,275,302 | B1 | 3/2016 | Yan et al. |
| 9,286,694 | B2 | 3/2016 | Kim et al. |
| 9,319,139 | B2 | 4/2016 | Effenberger et al. |
| 9,405,008 | B2 | 8/2016 | Raskar et al. |
| 9,426,450 | B1* | 8/2016 | Zhang .................. G02B 7/285 |
| 9,435,891 | B2 | 9/2016 | Oggier |
| 9,542,749 | B2 | 1/2017 | Freedman et al. |
| 9,557,166 | B2 | 1/2017 | Thuries et al. |
| 9,760,837 | B1 | 9/2017 | Nowozin et al. |
| 9,806,813 | B2 | 10/2017 | Liu et al. |
| 9,860,618 | B2 | 1/2018 | Liu et al. |
| 2004/0141753 | A1 | 7/2004 | Euw et al. |
| 2004/0208272 | A1 | 10/2004 | Moursund et al. |
| 2005/0207755 | A1 | 9/2005 | Rabbat et al. |
| 2006/0239558 | A1 | 10/2006 | Rafii et al. |
| 2007/0024614 | A1 | 2/2007 | Tam et al. |
| 2007/0279415 | A1 | 12/2007 | Sullivan et al. |
| 2009/0080885 | A1 | 3/2009 | Mehrotra et al. |
| 2009/0190853 | A1* | 7/2009 | Noh ...................... H04N 1/409 382/264 |
| 2010/0302365 | A1 | 12/2010 | Finocchio et al. |
| 2011/0188773 | A1 | 8/2011 | Wei et al. |
| 2011/0243570 | A1 | 10/2011 | Kim et al. |
| 2012/0069009 | A1 | 3/2012 | Shimoyama et al. |
| 2012/0182394 | A1 | 7/2012 | Bae et al. |
| 2012/0306876 | A1 | 12/2012 | Shotton et al. |
| 2013/0051516 | A1* | 2/2013 | Yang ...................... A61B 6/03 378/4 |
| 2013/0129224 | A1* | 5/2013 | Katz .................. G06K 9/00201 382/199 |
| 2013/0207970 | A1 | 8/2013 | Shpunt et al. |
| 2013/0278604 | A1 | 10/2013 | Georgis et al. |
| 2013/0329012 | A1 | 12/2013 | Bartos et al. |
| 2014/0092221 | A1 | 4/2014 | Nagai |
| 2014/0240467 | A1 | 8/2014 | Petyushko et al. |
| 2014/0253679 | A1* | 9/2014 | Guigues ................ G01S 17/89 348/42 |
| 2014/0253691 | A1 | 9/2014 | Holz |
| 2014/0293993 | A1 | 10/2014 | Ryhorchuk |
| 2014/0333728 | A1 | 11/2014 | Navab et al. |
| 2014/0355901 | A1* | 12/2014 | Tezaur .................... G06T 5/003 382/255 |
| 2014/0376768 | A1* | 12/2014 | Troy ...................... G01S 17/46 382/103 |
| 2015/0022643 | A1 | 1/2015 | Stetson et al. |
| 2015/0024336 | A1 | 1/2015 | Blassnig et al. |
| 2015/0171968 | A1 | 6/2015 | Featherston et al. |
| 2015/0248765 | A1 | 9/2015 | Criminisi et al. |
| 2015/0309663 | A1 | 10/2015 | Seo et al. |
| 2015/0371393 | A1 | 12/2015 | Ramachandra et al. |
| 2015/0373322 | A1 | 12/2015 | Goma et al. |
| 2015/0378023 | A1 | 12/2015 | Royo et al. |
| 2016/0099777 | A1 | 4/2016 | Liu et al. |
| 2016/0124089 | A1* | 5/2016 | Meinherz ................ G01S 17/08 356/5.01 |
| 2016/0191759 | A1* | 6/2016 | Somanath .......... H04N 5/23212 348/349 |
| 2016/0239725 | A1 | 8/2016 | Liu et al. |
| 2016/0328828 | A1 | 11/2016 | Zhang et al. |
| 2017/0061701 | A1* | 3/2017 | Mittal .................... G06T 19/20 |
| 2017/0188017 | A1* | 6/2017 | Hall .................. G06K 9/00335 |
| 2017/0372527 | A1 | 12/2017 | Murali et al. |
| 2018/0034579 | A1 | 2/2018 | Liu et al. |

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", file history of related U.S. Appl. No. 15/477,369, filed Apr. 3, 2017.

Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.

Peter Shintani, Morio Usami, Kissei Matsumoto, Kazuyuki Shikama, Bibhudendu Mohapatra, Keith Resch, "3D Depth Map", file history of related U.S. Appl. No. 15/590,497, filed May 9, 2017.

Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.

Peter Shintani, Morio Usami, Kazuyuki Shikama, Keith Resch, "Generating 3D Depth Map Using Parallax", file history of related U.S. Appl. No. 15/798,914, filed Oct. 31, 2017.

Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.

Quang H. Nguyen, Minh N. Do, Sanjay J. Patel, "Depth image-based rendering from multiple cameras with 3D propagation algorithm", May 27, 2009.

Shuran Song, Jianxiong Xiao, "Sliding Shapes for 3D Object Detection in Depth Images", Abstract, Sep. 2014.

Yo-Sung Ho, Yun-Suk Kang, "Multi-View Depth Generation using Multi-Depth Camera System", Gwangju Institute of Science and Technology, Jan. 4, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", file history of related U.S. Appl. No. 15/370,197, filed Dec. 6, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", file history of related U.S. Appl. No. 15/371,433, filed Dec. 7, 2016.

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", file history of related U.S. Appl. No. 15/383,683, filed Dec. 19, 2016.

Riegler et al., "A Deep Primal-Dual Network for Guided Depth Super-Resolution", Institute for Computer Graphics and Vision, Graz University of TechnologyAustria, Jul. 28, 2016.

Schuon et al., "High-Quality Scanning Using Time-of-Flight Depth Superresolution", Stanford University, 2008.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Apr. 5, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 16, 2018.

Nathan Silberman, Rob Fergus, "Indoor Scene Segmentation using a Structured Light Sensor", Dept. of Computer Science, Nov. 6, 2011, Courant Institute, New York University, pp. 601-608.

(56) References Cited

OTHER PUBLICATIONS

Michael Taylor, Glenn Black, Javier Fernandez Rico, "Multipoint Slam Capture", file history of U.S. Appl. No. 16/019,140, filed Jun. 26, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Non-Final Office Action dated Jul. 12, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Applicant's response to Non-Final Office Action, filed Jul. 16, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Aug. 23, 2018.

Deter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Sep. 4, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Jun. 21, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jun. 27, 2018.

Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Jun. 15, 2018.

Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Jun. 20, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Final Office Action dated Sep. 10, 2018.

Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Final Office Action filed Sep. 12, 2018.

* cited by examiner

USING PATTERN RECOGNITION TO REDUCE NOISE IN A 3D MAP

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders. As understood herein, the use of such sensors by multiple devices can cause mutual interference. As also understood herein, such devices may use lasers to provide three dimensional (3D) depth maps of objects in the field of view of cameras of the devices, and such 3D depth maps can be problematic in terms of knowing when and when not to apply digital image noise reduction algorithms.

SUMMARY

As understood herein, noise reduction can be used in conjunction with pattern recognition to modify a three dimensional (3D) depth map. Specifically, in a camera based depth mapping system, depth information from a laser can be coded with colors to make the 3D depth map easier to interpret. Depth maps are discussed in the present assignee's U.S. Pat. No. 8,472,746. 3D depth maps generated using lasers are discussed in U.S. Pat. No. 9,456,307. Both of these documents are incorporated by reference herein.

As revealed here, in the event that the laser illumination is not sufficient, the depth information can have a low signal to noise ratio, i.e., it can be noisy. This means that if noise reduction is applied to such an image, the edges of object images can be blurred, reducing the sharpness of an image. Examples of digital image noise reduction techniques are discussed in the present assignee's U.S. Pat. No. 8,711,249, incorporated by reference herein.

As envisioned herein, to reduce the random noise in a depth map that is rendered using colors to convey the various depths, pattern recognition may be used to selectively apply noise reduction or to modulate the strength of the noise reduction. In this way, the potential adverse effect on the detail/sharpness of the image can be ameliorated. For example, in an image of a person, the skin does not have any sharp edges so noise reduction can be applied to such an image with little adverse consequence, whereas noise reduction applied to the image of a person's eye can cause loss of the detail of the iris, eyelashes, etc. Using pattern recognition on objects in the image, the appropriate level of noise reduction can be applied across an image while minimizing blurring/loss of detail.

Accordingly, a device includes at least one computer medium that is not a transitory signal and that comprises instructions executable by at least one processor to receive a digital depth map, and to execute image recognition on the depth map. The instructions are executable to, based at least in part on the image recognition, identify a first object, and based at least in part on the image recognition, identify a second object. The instructions are also executable to identify a first noise reduction level associated with the first object and to identify a second noise reduction level associated with the second object, the first noise reduction level being different from the second level noise reduction level, and to apply the first and second noise reduction levels to the respective first and second objects.

The digital depth map may be based on laser emissions. It may thus be laser-generated. The instructions may be executable to access at least one data structure, and using the data structure, correlate the first object with the first noise reduction level. The instructions also may be executable to, using the data structure, correlate the second object with the second noise reduction level. The device may include the processor.

In example embodiments, the second noise reduction level is less than the first noise reduction level, and the second object includes an ocular iris. In some examples, the second noise reduction level is less than the first noise reduction level, and the second object includes at least one eyelash. The second noise reduction level may be zero such that no noise reduction is applied to the second object.

In another aspect, a method includes applying noise reduction to reduce noise in a depth map that is rendered using colors to convey various depths of objects in an image. The method also includes executing pattern recognition on the image, and selectively adjusting the noise reduction and/or modulating a strength of the noise reduction based at least in part on the pattern recognition.

In another aspect, an assembly includes plural devices on at least one surface. Each device can include at least one laser range finder configured to output signals useful for generating images of other devices on the surface. At least one processor is configured with instructions for selectively applying noise reduction to at least a first one of the images based on pattern recognition executed on the first image.

In examples, some or all of the devices may be motorized for movement on the surface. One or more of the devices may include transceivers for receiving remote control signals from respective controllers.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Figure 1:
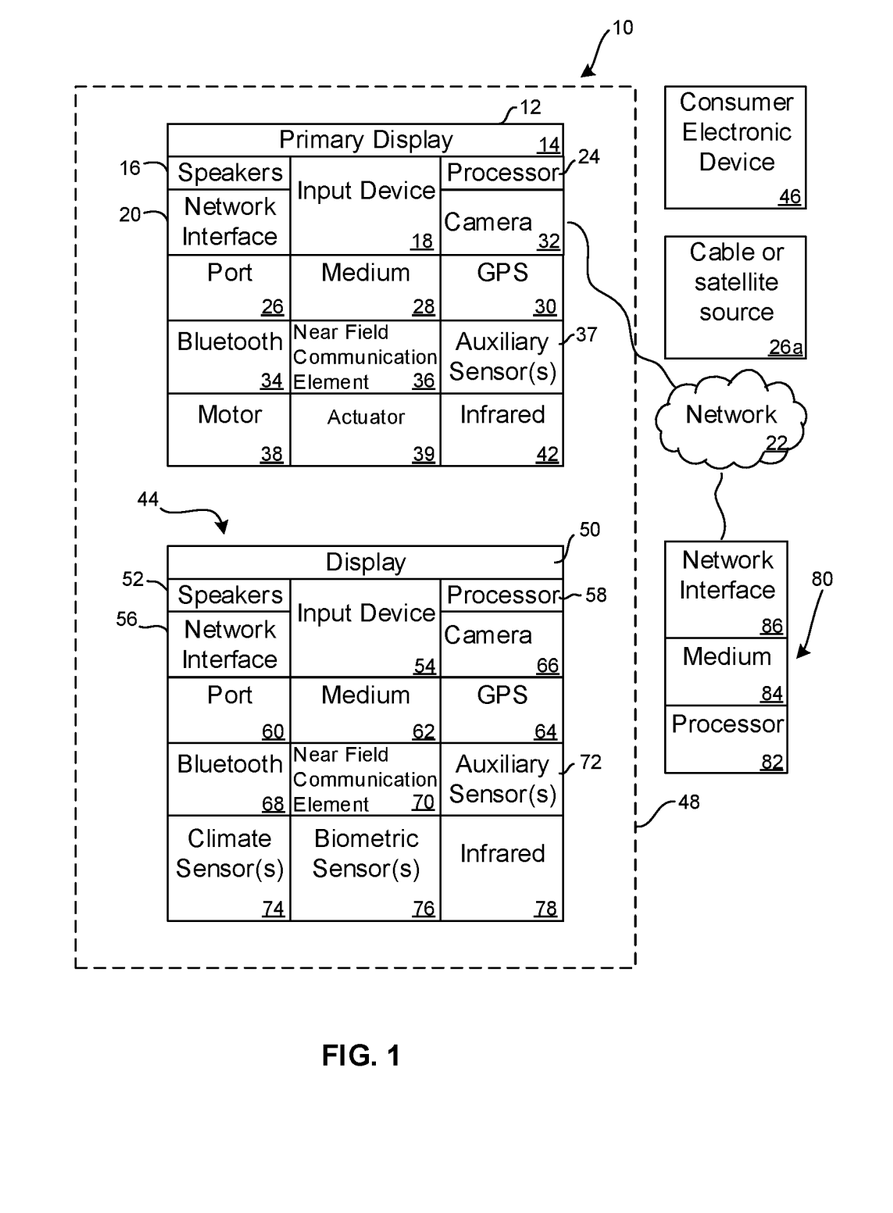
FIG. 1 is a block diagram of an example device.

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
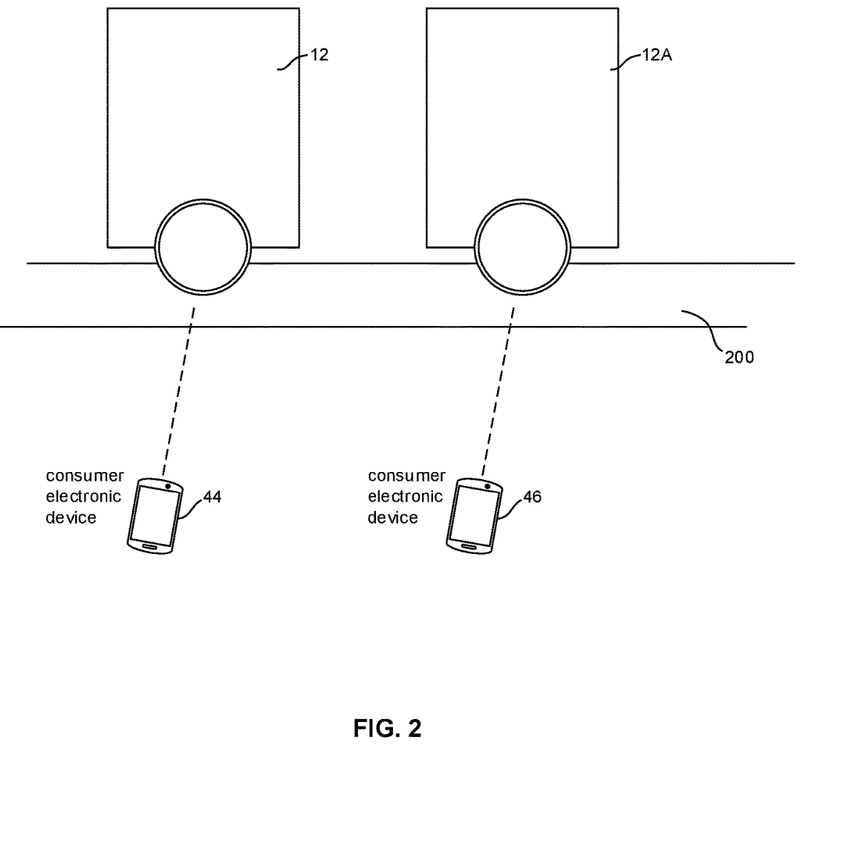
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
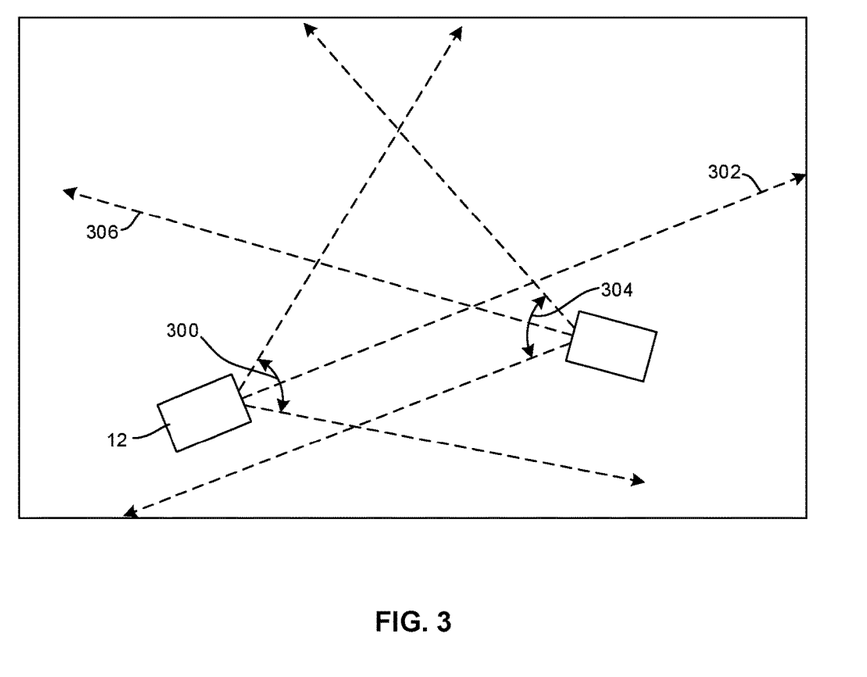
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown.

Figure 4:
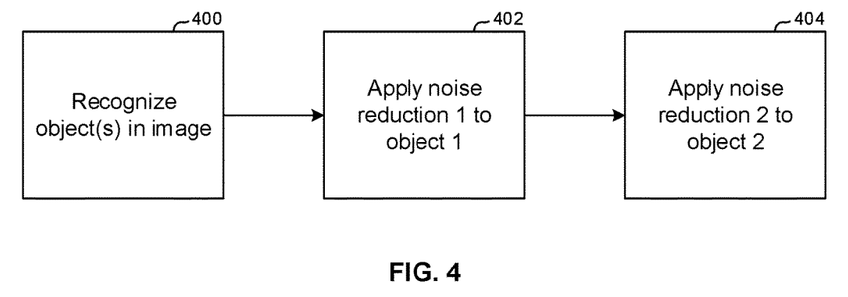
FIG. 4 is a flow chart of example general logic according to present principles.

FIG. 4 shows example general logic. Commencing at state 400, objects are recognized in one or more images from one or more cameras of the computerized devices 12, 12A shown in FIGS. 2 and 3. The images may be generated using the lasers of the devices and may be examples of 3D depth maps of the objects on the images. A first noise reduction level is applied to a first object in an image at state 402, while a second, different noise reduction level is applied to a second object in the same image at block 404.

Figure 5:
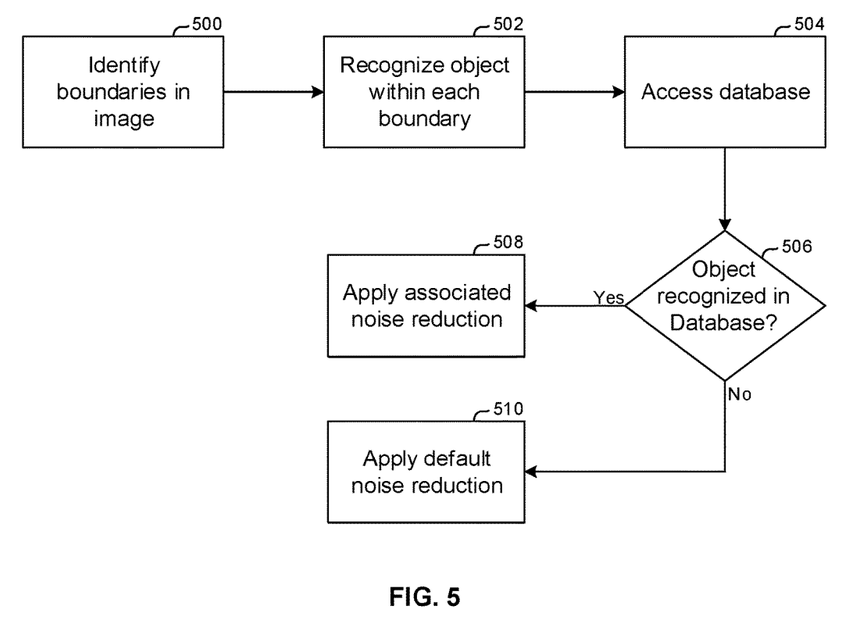
FIG. 5 is a flow chart of example specific logic according to present principles.

FIG. 5 shows example detailed logic that may be employed according to present principles. Commencing at block 500, object boundaries may be identified in an image such as a 3D depth map imaged by a camera on one of the devices 12, 12A shown in FIGS. 2 and 3. Boundaries may be identified by identifying a substantially continuous sequence of pixels in an image that have characteristics such as brightness, color, etc. that are similar to each other in the sequence but that are different by, e.g., a threshold amount from the characteristics of pixels nearby the sequence.

Proceeding to block 502, one or more pattern recognition algorithms are executed on the image to identify one or more objects within the boundaries, when boundary identification is employed. When block 500 is omitted pattern recognition may be applied to the entire image to identify one or more objects.

Figure 6:
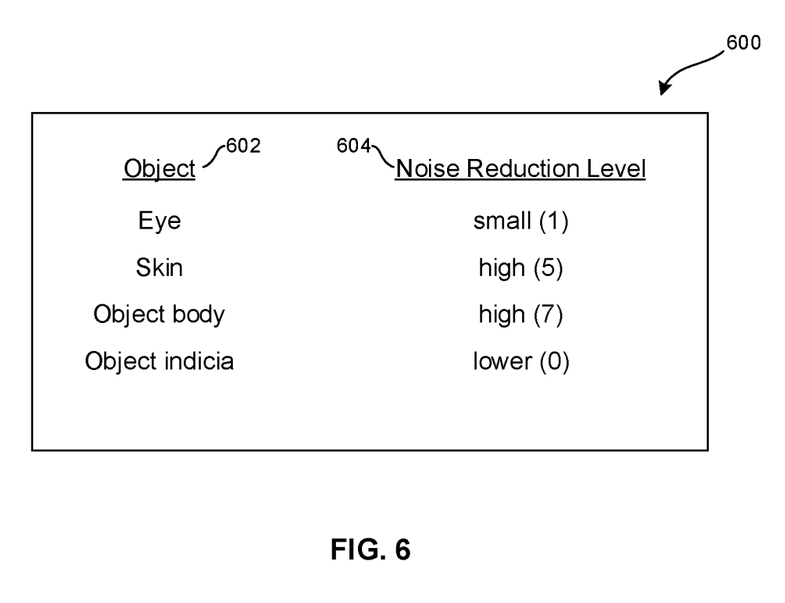
FIG. 6 is a schematic representation of an example data structure for associating noise reduction levels with recognized objects.

At block 504, a data structure such as but not limited to the data structure 600 shown in FIG. 6 is accessed using the objects identified in block 502 as entering arguments. If the recognized object is determined to be in the data structure at diamond 506, the logic can retrieve from the data structure a corresponding noise reduction level for that object at block 508 and apply it to the object. Example noise reduction techniques are provided in the above-incorporated U.S. Pat. No. 8,711,249. On the other hand, if the recognized object is determined not to be in the data structure at diamond 506, the logic can move to block 510 to either ignore the object, effectively applying no noise reduction to that object, or it can apply a default noise reduction level to the object.

FIG. 6 illustrates further. A column 602 provides a list of objects and a column 604 a list of corresponding noise reduction levels. When an object is recognized at block 502, it may be used as entering argument to the data structure 600 in FIG. 6 to determine if it matches one of the objects in the column 602, and if it does, the corresponding noise reduction level is retrieved from the column 604.

Thus, for one type of object, such as an eye or an eyelash (of, e.g., a device 12 modeled to resemble a person), a small level of noise reduction may be applied. The small level may be represented by a numeral, such as one (1). On the other hand, higher levels of noise reduction may be applied to other objects such as skin and body objects as shown. Indicia such as letters and numerals inscribed on an imaged device may be correlated with little or noise reduction as shown in FIG. 6. It is to be understood that a single image with multiple objects may thus have multiple different levels of the same noise reduction algorithm applied to respective different objects in the same single image based on pattern recognition.

While particular techniques and machines are herein shown and described in detail, it is to be understood that the subject matter which is encompassed by the present invention is limited only by the claims.

What is claimed is:

1. A device comprising:
at least one computer medium that is not a transitory signal and that comprises instructions executable by at least one processor to:
receive a digital depth map;
execute image recognition on the depth map;
based at least in part on the image recognition, identify a first object at least in part by identifying at least a segment of a continuous sequence of pixels in an image that have characteristics comparable to each other in the sequence but that are different by from characteristics of pixels nearby the sequence;
based at least in part on the image recognition, identify a second object;
identify a first noise reduction level associated with the first object;
identify a second noise reduction level associated with the second object, the first noise reduction level being different from the second level noise reduction level; and
apply the first and second noise reduction levels to respective entireties of the first and second objects.

2. The device of claim 1, wherein the digital depth map is based on laser emissions.

3. The device of claim 1, wherein the instructions are executable to:
access at least one data structure; and
using the data structure, correlate the first object with the first noise reduction level.

4. The device of claim 3, wherein the instructions are executable to:
using the data structure, correlate the second object with the second noise reduction level.

5. The device of claim 1, comprising the at least one processor.

6. The device of claim 1, where in the second noise reduction level is less than the first noise reduction level, and the second object comprises an ocular iris.

7. The device of claim 1, wherein the second noise reduction level is less than the first noise reduction level, and the second object comprises at least an eyelash.

8. The device of claim 1, wherein the second noise reduction level is zero such that no noise reduction is applied to the second object.

9. An assembly comprising:
plural devices;
each device comprising at least one range finder configured to output signals useful for generating images of other devices on the surface;
at least one processor configured with instructions for selectively applying noise reduction to at least a first one of the images based on pattern recognition executed on the first image, wherein the instructions are executable to:
receive a digital depth map generated by signals from at least one of the range finders;
execute image recognition on the depth map;
based at least in part on the image recognition, identify a first object at least in part by identifying at least a segment of a continuous sequence of pixels in an image that have characteristics similar to each other in the sequence but that are different by from characteristics of pixels nearby the sequence;
based at least in part on the image recognition, identify a second object;
identify a first noise reduction level associated with the first object;
identify a second noise reduction level associated with the second object, the first noise reduction level being different from the second level noise reduction level; and
apply the first and second noise reduction levels to entireties of the respective first and second objects.

10. The assembly of claim 9, wherein at least some of the devices are motorized for movement on at least one surface, the devices being disposed on the surface.

11. The assembly of claim 9, wherein at least some of the devices comprise transceivers for receiving remote control signals from respective controllers.

12. The assembly of claim 9, wherein the at least one range finder comprises at least one laser range finder.

13. The assembly of claim 9, wherein the instructions are executable to:
access at least one data structure, and
using the data structure, correlate the first object with the first noise reduction level.

14. The assembly of claim 13, wherein the instructions are executable to:
using the data structure, correlate the second object with the second noise reduction level.

15. The assembly of claim 9, wherein the second noise reduction level is less than the first noise reduction level.

16. The assembly of claim 9, wherein the second noise reduction level is zero such that no noise reduction is applied to the second object.

* * * * *